(12) United States Patent
Bai

(10) Patent No.: US 10,326,819 B2
(45) Date of Patent: Jun. 18, 2019

(54) METHOD AND APPARATUS FOR DETECTING ACCESS PATH

(71) Applicant: Baidu Online Network Technology (Beijing) Co., Ltd., Beijing (CN)

(72) Inventor: Yu Bai, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 0 days.

(21) Appl. No.: 15/547,545

(22) PCT Filed: Jul. 3, 2017

(86) PCT No.: PCT/CN2017/091454
§ 371 (c)(1),
(2) Date: Jul. 31, 2017

(87) PCT Pub. No.: WO2018/028345
PCT Pub. Date: Feb. 15, 2018

(65) Prior Publication Data
US 2018/0048697 A1    Feb. 15, 2018

(30) Foreign Application Priority Data

Aug. 9, 2016   (CN) .......................... 2016 1 0647467

(51) Int. Cl.
*G06F 13/00*     (2006.01)
*H04L 29/08*     (2006.01)
(Continued)

(52) U.S. Cl.
CPC .......... *H04L 67/02* (2013.01); *G06F 12/0813* (2013.01); *H04L 45/72* (2013.01);
(Continued)

(58) Field of Classification Search
CPC ..... H04L 67/02; H04L 47/82; H04L 67/2842; H04L 45/72; G06F 12/0813; G06F 2212/60; G06F 2212/62
(Continued)

(56) References Cited

U.S. PATENT DOCUMENTS 7,194,546 B2 *   3/2007   Kameoka .......... G06F 17/30867
                                                       707/E17.109
7,260,645 B2 *   8/2007   Bays .................. H04L 41/0253
                                                              709/224
(Continued)

FOREIGN PATENT DOCUMENTS

CN       101763357 A       6/2010
CN       103516607 A       1/2014
(Continued)

OTHER PUBLICATIONS

International Search Report in International Application No. PCT/CN2017/091454, dated Sep. 28, 2017 (5 pages, w/English translation).
(Continued)

*Primary Examiner* — Kenneth R Coulter
(74) *Attorney, Agent, or Firm* — Nixon Peabody LLP

(57) ABSTRACT

The present disclosure discloses a method and an apparatus for detecting an access path. A specific implementation of the method includes: in response to receiving an access request for a source website, selecting a plurality of preset paths as candidate paths according to an address of the source website; transmitting the access request to the source website along each of the candidate paths in sequence until a successful transmission is detected; and in response to detecting the successful transmission, recording a successfully transmitting path as a default path for accessing the source website next time. This implementation implements
(Continued)

dynamic adjustment of a website access path and maximizes a website access success ratio.

12 Claims, 5 Drawing Sheets

(51) Int. Cl.
G06F 12/0813 (2016.01)
H04L 12/911 (2013.01)
H04L 12/721 (2013.01)

(52) U.S. Cl.
CPC .......... *H04L 47/82* (2013.01); *H04L 67/2842* (2013.01); *G06F 2212/60* (2013.01); *G06F 2212/62* (2013.01)

(58) Field of Classification Search
USPC .................................. 709/238–244, 217–219
See application file for complete search history.

(56) References Cited

U.S. PATENT DOCUMENTS

| | | | |
|---|---|---|---|
| 2002/0165940 A1* | 11/2002 | Kameoka | G06F 17/30867 709/218 |
| 2003/0204619 A1* | 10/2003 | Bays | H04L 41/0253 709/238 |
| 2013/0097277 A1 | 4/2013 | Kim | |
| 2017/0054852 A1* | 2/2017 | McGreevy | H04M 3/5235 |

FOREIGN PATENT DOCUMENTS

| | | |
|---|---|---|
| CN | 103716348 A | 4/2014 |
| CN | 104243320 A | 12/2014 |
| CN | 104954219 A | 9/2015 |
| CN | 105515915 A | 4/2016 |

OTHER PUBLICATIONS

Written Opinion in International Application No. PCT/CN2017/091454, dated Sep. 28, 2017 (3 pages).

* cited by examiner

200

```
┌─────────────────────────────────────────┐
│ in response to receiving an access       │ ── 201
│ request for a source website, selecting  │
│ a plurality of preset paths as candidate │
│ paths according to an address of the     │
│ source website                           │
└─────────────────────────────────────────┘
                    │
                    ▼
┌─────────────────────────────────────────┐
│ transmitting the access request to the   │ ── 202
│ source website along each of the         │
│ candidate paths in sequence until        │
│ a successful transmission is detected    │
└─────────────────────────────────────────┘
                    │
                    ▼
┌─────────────────────────────────────────┐
│ in response to detecting the successful  │ ── 203
│ transmission, recording a successfully   │
│ transmitting path as a default path for  │
│ accessing the source website next time   │
└─────────────────────────────────────────┘
```

Fig. 2

METHOD AND APPARATUS FOR DETECTING ACCESS PATH

CROSS-REFERENCE TO RELATED APPLICATION

This application is a U.S. National Stage of International Application No. PCT/CN2017/091454, filed Jul. 3, 2017, which is related to and claims the benefit and priority of Chinese Patent Application No. 201610647467.4 filed on Aug. 9, 2016, the contents of which are incorporated herein in their entireties by reference.

TECHNICAL FIELD

The present disclosure relates to the field of computer technology, specifically to the field of Internet technology, and more particularly, to a method and an apparatus for detecting an access path.

BACKGROUND

Because domestic networks include a plurality of Internet Service Providers (ISPs), packet loss or delay often occurs in network access, particularly in cross-ISP access, which causes a failure in users browsing a website. Meanwhile, various security devices (for example, firewalls, Web Application Firewall) in the networks may also mistakenly intercept normal requests. These problems have a negative effect on website access experience and thus reduce a service quality of website access.

Existing content delivery network (CDN) products may generally adopt a back-to-source retry to solve the problem that node access to a source website is unavailable, which has certain effects in the event that the network is temporarily interrupted, but has no effect in the event that the network is blocked for a long time or intercepted by the security devices.

In traditional CDN systems, each node only has one path to access the source website, and thus failure of browsing requests from the users may occur when the path is blocked.

SUMMARY

An objective of the present application is to provide a method and apparatus for detecting an access path, in order to solve the technical problem mentioned in the foregoing Background section.

In a first aspect, the present disclosure provides a method for detecting an access path, which comprises: in response to receiving an access request for a source website, selecting a plurality of preset paths as candidate paths according to an address of the source website; transmitting the access request to the source website along each of the candidate paths in sequence until a successful transmission is detected; and in response to detecting the successful transmission, recording a successfully transmitting path as a default path for accessing the source website next time.

In some embodiments, the plurality of preset paths comprise at least one of: a directly transmitting path, a path transmitting via a inter-network node, and a path transmitting via a same-network node.

In some embodiments, the method further comprises: setting cache time of the default path, and clearing the default path when the cache time is exceeded.

In some embodiments, the transmitting the access request to the source website along each of the candidate paths in sequence until a successful transmission is detected further comprises: detecting whether a default path exists; and in response to detecting that the default path exists, transmitting the access request to the source website along each of the candidate paths in sequence starting from the default path until a successful transmission is detected.

In some embodiments, the transmitting the access request to the source website along each of the candidate paths in sequence further comprises: in response to transmitting the access request along an indirectly transmitting path, adding a counter into an HTTP request header of the access request, wherein an initial value of the counter is the number of nodes comprised in the indirectly transmitting path, and one is subtracted from the counter every time one node is passed.

In some embodiments, the plurality of preset paths further comprise: a path transmitting via a inter-network node and a same-network node.

In a second aspect, the present disclosure provides an apparatus for detecting an access path, which comprises: a selecting unit, configured to, in response to receiving an access request for a source website, select a plurality of preset paths as candidate paths according to an address of the source website; a detecting unit, configured to transmit the access request to the source website along each of the candidate paths in sequence until a successful transmission is detected; and a recording unit, configured to, in response to detecting the successful transmission, record a successfully transmitting path as a default path for accessing the source website next time.

In some embodiments, the plurality of preset paths comprise at least one of: a directly transmitting path, a path transmitting via a inter-network node, and a path transmitting via a same-network node.

In some embodiments, the apparatus further comprises: a cache unit, configured to set cache time of the default path, and clear the default path when the cache time is exceeded.

In some embodiments, the detecting unit is further configured to: detect whether a default path exists; and in response to detecting that the default path exists, transmit the access request to the source website along each of the candidate paths in sequence starting from the default path until a successful transmission is detected.

In some embodiments, the detecting unit is further configured to: in response to transmitting the access request along an indirectly transmitting path, add a counter into an HTTP request header of the access request, wherein an initial value of the counter is the number of nodes comprised in the indirectly transmitting path, and one is subtracted from the counter every time one node is passed.

In some embodiments, the plurality of preset paths further comprise: a path transmitting via a inter-network node and a same-network node.

According to the method and apparatus for detecting an access path provided in the present disclosure, a node of each CDN has a plurality of paths to access a source website, the CDN system does not need to add any node or device, and a path to succeed may be dynamically selected when the node processes the access request from a user. In this way, an access success ratio may be maximized.

BRIEF DESCRIPTION OF THE DRAWINGS

Other features, objectives and advantages of the present application will become more apparent upon reading the detailed description to non-limiting embodiments with reference to the accompanying drawings:

FIG. 2 is a schematic flowchart of a method for detecting an access path according to an embodiment of the present application;

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
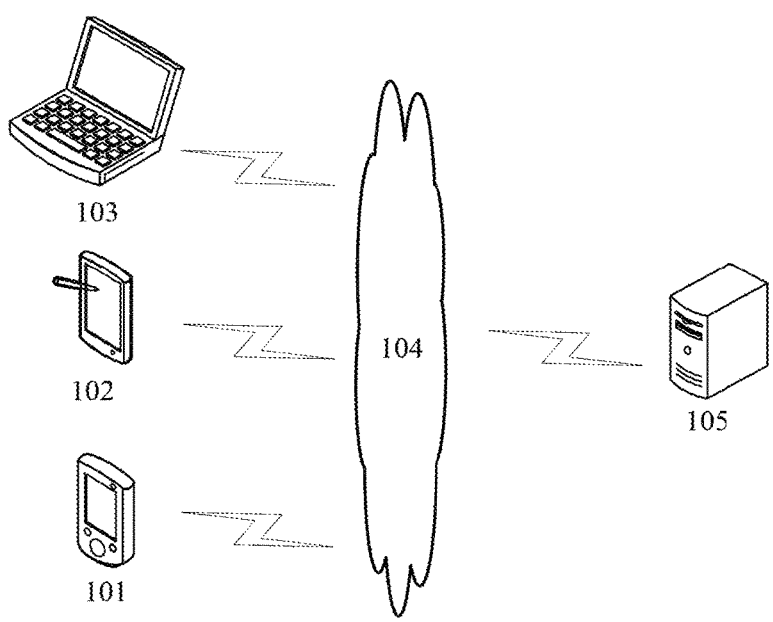
FIG. 1 is an architectural diagram of an exemplary system in which the present application may be implemented.

FIG. 1 shows an exemplary architecture of a system 100 applicable to the method or apparatus for detecting an access path according to the embodiments of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as webpage browser applications, shopping applications, search applications, instant messaging tools, mailbox clients, and social platform software may be installed on the terminal devices 101, 102 and 103.

The terminal devices 101, 102 and 103 may be various electronic devices having a display screen and supporting network applications, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a CDN node server for speeding up the access to a website by using the terminal devices 101, 102 and 103. The CDN node server may analyze or process the received access request for a source website and other data, and then may direct in real time the access request for the source website from a user to a nearest service node from the user, according to the network traffic, the connection and load of nodes, the distance and response time to the user, and/or any other information.

It should be noted that the method for detecting an access path according to the embodiments of the present application is generally executed by the server 105. Accordingly, the apparatus for detecting an access path is generally installed on the server 105.

It is to be understood that the number of the terminal devices, the networks and the servers in FIG. 1 is merely exemplary. Any number of the terminal devices, the networks and the servers may be provided as required.

Referring to FIG. 2, a flowchart 200 of a method for detecting an access path according to an embodiment of the present disclosure is illustrated. The method for detecting an access path comprises the following steps.

Step 201: in response to receiving an access request for a source website, selecting a plurality of preset paths as candidate paths according to an address of the source website.

In this embodiment, an electronic device (for example, a server as shown in FIG. 1) on which the method for detecting an access path runs may receive an access request for the source website from a terminal used by a user for website access by way of wired connection or wireless connection. The access request for the source website comprises an address of the source website that the user expects to access, that is, the website. For example, the user enters a domain name of the website to be accessed in a browser of the user, and the browser first checks whether there is an IP (Internet Protocol) value corresponding to the domain name. The browser directly uses the IP to access the website when there is the IP corresponding to the domain name. The browser requests to resolve the domain name from a local DNS (Domain Name System) server when there is no IP address corresponding to the domain name. The local DNS server is a DNS allocated by a local ISP. The local DNS server searches for an authorized DNS record from a root DNS server, and the record is returned to the local DNS server. After a domain name resolution request is transmitted to a CDN server, the server transmits an IP of a node to which the domain name responds the most quickly to the local DNS server so that the local DNS server transmits the IP to the user. After obtaining the IP address, the user issues an access request to a CDN node. A plurality of preset paths are selected as candidate paths to acquire data from the source website according to the address of the source website when the CDN node having received the access request does not cache responded content or the cache has expired.

In some optional implementations of this embodiment, the plurality of preset paths comprise at least one of: a directly transmitting path, a path transmitting via a inter-network node, and a path transmitting via a same-network node. The directly transmitting path is a path through which the CDN node is directly connected the source website without other nodes. The path transmitting via a inter-network node is a path, between the CDN node and the source website, that needs to pass through a network node of a different operator. The inter-network node is positioned between a network of one operator and a network of another operator. The path transmitting via a same-network node is a path, between the CDN node and the source website, that needs to pass through a network node of the same operator.

In some optional implementations of this embodiment, the plurality of preset paths further comprise: a path transmitting via a inter-network node and a same-network node.

The path transmitting via a inter-network node and a same-network node is a path, between the CDN node and the source website, that needs to pass through at least one network node of the same operator and at least one network node of a different operator.

Step 202: transmitting the access request to the source website along each of the candidate paths in sequence until a successful transmission is detected.

In this embodiment, in the access request from the same user, a node may attempt to transmit the access request to the source website on a plurality of paths configured thereon in sequence, and may attempt to use next path when the transmission is unsuccessful on a previous path until a successful transmission is detected.

In some optional implementations of this embodiment, in response to transmitting the access request along an indirectly transmitting path, a counter is added into an HTTP request header of the access request, wherein an initial value of the counter is the number of nodes comprised in the indirectly transmitting path, and one is subtracted from the counter every time one node is passed. For example, a path transmitting via a inter-network node is selected to send the access request, wherein the path comprises three nodes. A TTL (Time To Live) counter is added into an HTTP (Hyper-Text Transfer Protocol) request header of the access request before transmitting the access request, wherein an initial value of the counter is three, and one is subtracted from the counter every time one node passes. The node having received the access request may discard the request when a count value is zero, which may prevent an infinite loop of the access request between the CDN nodes caused by a configuration error.

Step 203: in response to detecting the successful transmission, recording a successfully transmitting path as a default path for accessing the source website next time.

In this embodiment, the transmission result of Step 202 is detected, and a successfully transmitting path is recorded as a default path for accessing the source website next time in case of a successful transmission.

In some optional implementations of this embodiment, cache time of the default path is set, and the default path is cleared when the cache time is exceeded. For example, when the cache time of the default path is set to two hours, the default path is used by default for accessing the source website within two hours, and the default path is cleared away after the two hours.

Figure 3:
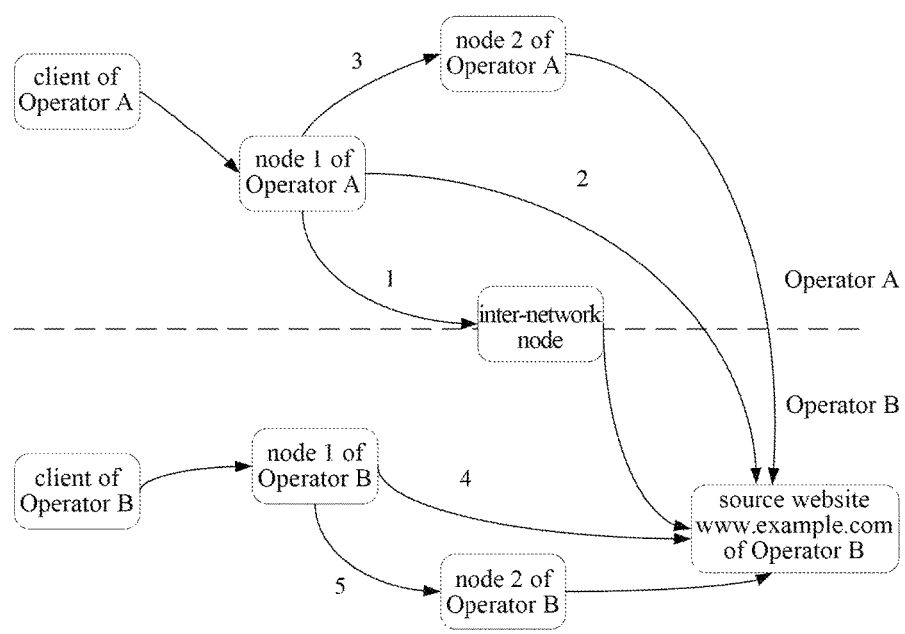
FIG. 3 is a schematic diagram of an application scenario of the method for detecting an access path according to the present application.

Continuing referring to FIG. 3, a schematic diagram of an application scenario of the method for detecting an access path according to this embodiment is shown. In the application scenario as shown in FIG. 3, three paths are configured for the source website www.example.com by Node 1 of Operator A:

Path 1: a path transmitting via a inter-network node;
Path 2: a directly transmitting path; and
Path 3: a path transmitting via Node 2 of Operator A.
Two paths are configured by Node 1 of Operator B:
Path 4: a directly transmitting path; and
Path 5: a path transmitting via Node 2 of Operator B.

When Node 1 of Operator A receives the access request for the source website www.example.com transmitted by the user via a client of Operator A, it is attempted to transmit the access request via the three preset paths in sequence. It is unnecessary to transmit the access request via Path 2 or Path 3 when the access request has been successively transmitted via Path 1, and Path 1 is set as the default path to access the source website www.example.com.

When Node 1 of Operator B receives the access request for the source website www.example.com transmitted by the user via a client of Operator B, it is attempted to transmit the access request via the two preset paths in sequence. It is unnecessary to transmit the access request via Path 5 when the access request has been successively transmitted via Path 4, and Path 4 is set as the default path to access the source website www.example.com.

According to the method provided by the embodiments of the present disclosure, a path may be dynamically selected, so that a problem that node access to the source website is unavailable may be solved in the event that the network is blocked for a long time or intercepted by a security device. In this way, an access success ratio may be maximized.

Figure 4:
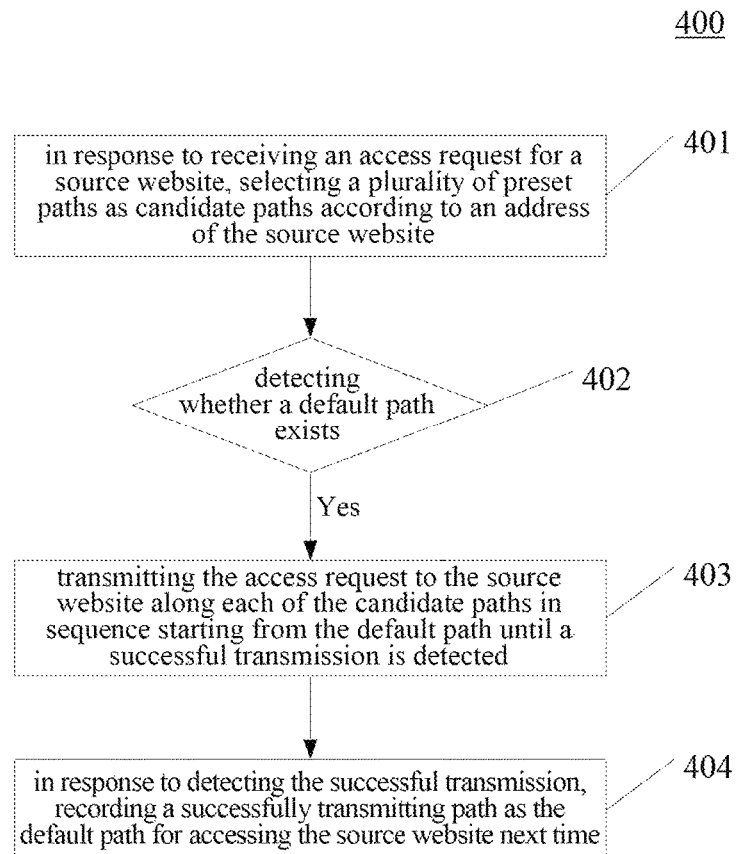
FIG. 4 is a schematic flowchart of a method for detecting an access path according to another embodiment of the present application.

Further referring to FIG. 4, a flowchart 400 of the method for detecting an access path according to still another embodiment is illustrated. The flowchart 400 of the method for detecting an access path comprises following steps.

Step 401: in response to receiving an access request for a source website, selecting a plurality of preset paths as candidate paths according to an address of the source website.

Step 401 is basically identical to Step 201, and thus is not repeated.

Step 402: detecting whether a default path exists.

In this embodiment, it is detected whether the default path exists before selecting a to-be-used path to transmit the access request for the source website.

Step 403: transmitting the access request to the source website along each of the candidate paths in sequence starting from the default path until a successful transmission is detected.

In this embodiment, based on the detection result of Step 402, in response to detecting that the default path exists, the access request is transmitted to the source website along each of the candidate paths in sequence starting from the default path until a successful transmission is detected. In response to detecting that no default path exists, the access request is transmitted to the source website along each of the candidate paths in sequence starting from the first path until a successful transmission is detected.

Step 404: in response to detecting the successful transmission, recording a successfully transmitting path as the default path for accessing the source website next time.

Step 404 is basically identical to Step 203, and thus is not repeated.

As can be seen from FIG. 4, compared with the embodiment corresponding to FIG. 2, the flowchart 400 of the method for detecting an access path in this embodiment highlights the step of using the default path to transmit the access request. Thus, the scheme as described in this embodiment can increase the access success ratio and save time in searching a path.

Figure 5:
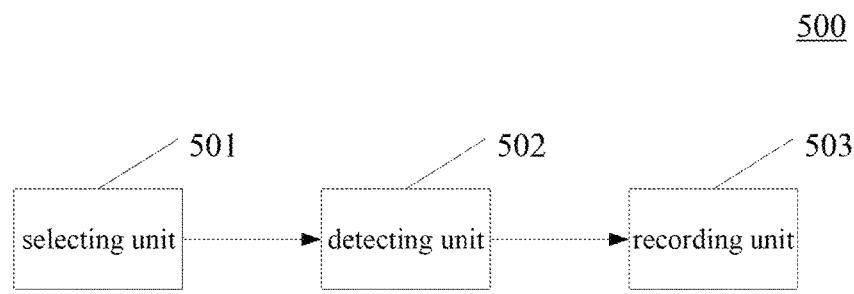
FIG. 5 is a diagram showing the structure of the apparatus for detecting an access path according to an embodiment of the present application.

Further referring to FIG. 5, as an implementation of the method as shown in the foregoing figures, the present disclosure provides an embodiment of an apparatus for detecting an access path. The apparatus embodiment corresponds to the method embodiment as shown in FIG. 2, and the apparatus specifically may be used in various electronic devices.

As shown in FIG. 5, the apparatus 500 for detecting an access path according to this embodiment comprises: a selecting unit 501, a detecting unit 502 and a recording unit 503. The selecting unit 501 is configured to, in response to receiving an access request for a source website, select a plurality of preset paths as candidate paths according to an address of the source website. The detecting unit 502 is configured to transmit the access request to the source website along each of the candidate paths in sequence until a successful transmission is detected. The recording unit 503 is configured to, in response to detecting the successful transmission, record a successfully transmitting path as a default path for accessing the source website next time.

In this embodiment, after the selecting unit 501 selects a candidate path for transmitting the access request, the detecting unit 502 may detect a successfully transmitting path, and then the recording unit 503 records the successfully transmitting path as the default path for accessing the source website next time.

In some optional implementations of this embodiment, the plurality of preset paths comprise at least one of: a directly transmitting path, a path transmitting via a inter-network node, and a path transmitting via a same-network node.

In some optional implementations of this embodiment, the apparatus 500 further comprises a cache unit, configured to set cache time of the default path, and clear the default path when the cache time is exceeded.

In some optional implementations of this embodiment, the detecting unit 502 is further configured to: detect whether a default path exists; and in response to detecting that the default path exists, transmit the access request to the source website along each of the candidate paths in sequence starting from the default path until a successful transmission is detected.

In some optional implementations of this embodiment, the detecting unit 502 is further configured to: in response to transmitting the access request along an indirectly transmitting path, add a counter into an HTTP request header of the access request, wherein an initial value of the counter is the number of nodes comprised in the indirectly transmitting path, and one is subtracted from the counter every time one node is passed.

In some optional implementations of this embodiment, the plurality of preset paths further comprise: a path transmitting via a inter-network node and a same-network node.

Figure 6:
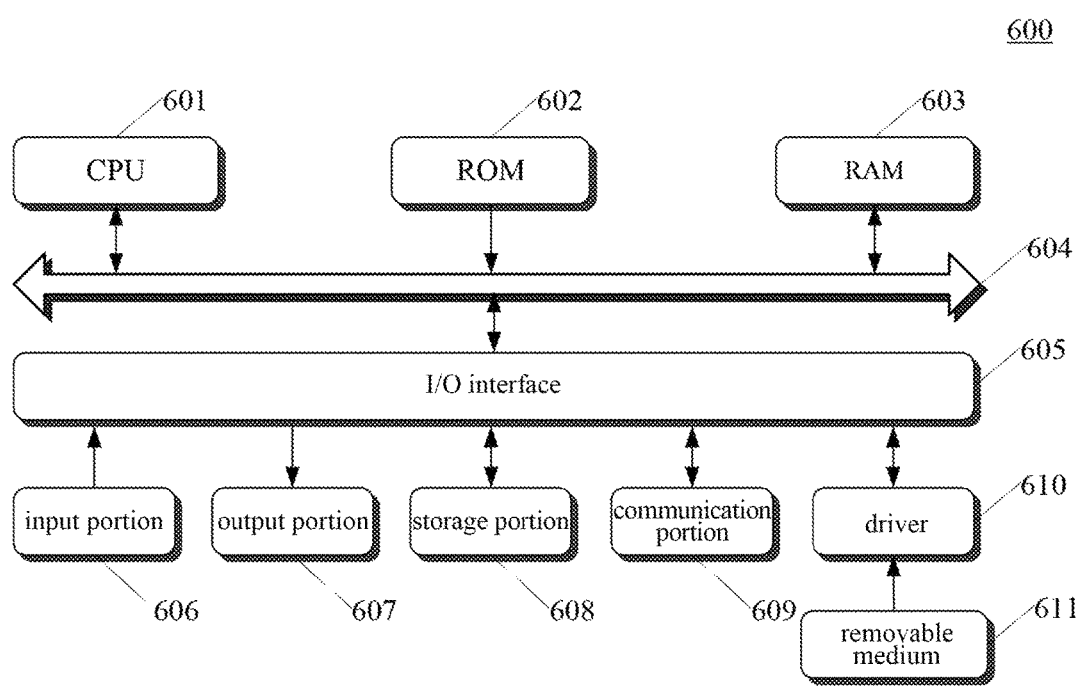
FIG. 6 illustrates a structural schematic diagram of a computer system adapted to implement a server of the embodiments of the present application.

Referring to FIG. 6, a schematic structural diagram of a computer system 600 adapted to implement a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the CPU 601, implements the functions as defined by the methods of the present disclosure.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an selecting unit, a detecting unit and a recording unit, where the names of these units or modules do not in some cases constitute a limitation to such units or modules themselves. For example, the selecting unit may also be described as "a unit for selecting a plurality of preset paths as candidate paths according to an address of the source website, in response to receiving an access request for a source website."

In another aspect, the present application further provides a non-volatile computer-readable storage medium. The non-volatile computer-readable storage medium may be the non-volatile computer storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to: in response to receiving an access request for a source website, select a plurality of preset paths as candidate paths according to an address of the source website; transmit the access request to the source website along each of the candidate paths in sequence until a successful transmission is detected; and in response to detecting the successful transmission, record a successfully transmitting path as a default path for accessing the source website next time.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for detecting an access path, comprising:
in response to receiving an access request for a source website, selecting a plurality of preset paths as candidate paths according to an address of the source website; wherein the plurality of preset paths comprise at least one of: a directly transmitting path, a path transmitting via an inter-network node, or a path transmitting via a same-network node;
transmitting the access request to the source website along each of the candidate paths in sequence until a successful transmission is detected; and
in response to detecting the successful transmission, recording a successfully transmitting path as a default path for accessing the source website next time;
wherein in response to transmitting the access request along an indirectly transmitting path, adding a counter into an HTTP request header of the access request, wherein an initial value of the counter is a number of nodes comprised in the indirectly transmitting path, and one is subtracted from the counter every time one node is passed.

2. The method for detecting an access path according to claim 1, further comprising:
setting cache time of the default path, and clearing the default path when the cache time is exceeded.

3. The method for detecting an access path according to claim 1, wherein the transmitting the access request to the source website along each of the candidate paths in sequence until a successful transmission is detected further comprises:
detecting whether a default path exists; and
in response to detecting that the default path exists, transmitting the access request to the source website along each of the candidate paths in sequence starting from the default path until a successful transmission is detected.

4. The method for detecting an access path according to claim 1, wherein the plurality of preset paths further comprise a path transmitting via a inter-network node and a same-network node.

5. A device, comprising:
a processor; and
a memory,
the memory storing computer-readable instructions, which when executed by the processor, cause the processor to perform operations, the operations comprising:
in response to receiving an access request for a source website, selecting a plurality of preset paths as candidate paths according to an address of the source website; wherein the plurality of preset paths comprise at least one of: a directly transmitting path, a path transmitting via an inter-network node, or a path transmitting via a same-network node;
transmitting the access request to the source website along each of the candidate paths in sequence until a successful transmission is detected; and
in response to detecting the successful transmission, recording a successfully transmitting path as a default path for accessing the source website next time;
wherein in response to transmitting the access request along an indirectly transmitting path, adding a counter into an HTTP request header of the access request, wherein an initial value of the counter is a number of nodes comprised in the indirectly transmitting path, and one is subtracted from the counter every time one node is passed.

6. The device according to claim 5, wherein the operations further comprises:
setting cache time of the default path, and clearing the default path when the cache time is exceeded.

7. The device according to claim 5, wherein the transmitting the access request to the source website along each of the candidate paths in sequence until a successful transmission is detected further comprises:
detecting whether a default path exists; and
in response to detecting that the default path exists, transmitting the access request to the source website along each of the candidate paths in sequence starting from the default path until a successful transmission is detected.

8. The device according to claim 5, wherein the plurality of preset paths further comprise a path transmitting via a inter-network node and a same-network node.

9. A non-transitory computer storage medium, storing computer-readable instructions, which when executed by a processor, cause the processor to perform operations, the operations comprising:
in response to receiving an access request for a source website, selecting a plurality of preset paths as candidate paths according to an address of the source website; wherein the plurality of preset paths comprise at least one of: a directly transmitting path, a path transmitting via an inter-network node, or a path transmitting via a same-network node;
transmitting the access request to the source website along each of the candidate paths in sequence until a successful transmission is detected; and
in response to detecting the successful transmission, recording a successfully transmitting path as a default path for accessing the source website next time;
wherein in response to transmitting the access request along an indirectly transmitting path, adding a counter into an HTTP request header of the access request, wherein an initial value of the counter is a number of nodes comprised in the indirectly transmitting path, and one is subtracted from the counter every time one node is passed.

10. The non-transitory computer storage medium according to claim 9, wherein the operations further comprises:
setting cache time of the default path, and clearing the default path when the cache time is exceeded.

11. The non-transitory computer storage medium according to claim 9, wherein the transmitting the access request to the source website along each of the candidate paths in sequence until a successful transmission is detected further comprises:
detecting whether a default path exists; and in response to detecting that the default path exists, transmitting the access request to the source website along each of the candidate paths in sequence starting from the default path until a successful transmission is detected.

12. The non-transitory computer storage medium according to claim 9, wherein the plurality of preset paths further comprise a path transmitting via a inter-network node and a same-network node.

\* \* \* \* \*